W. A. ROBERSON.
LIQUID HEATING RECEPTACLE.
APPLICATION FILED AUG. 29, 1911.
1,042,144.
Patented Oct. 22, 1912.
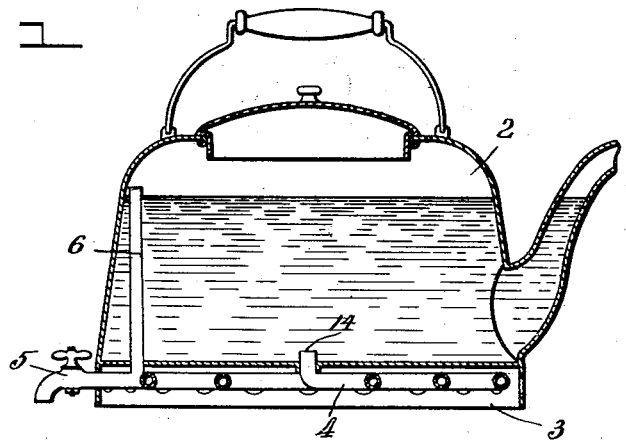
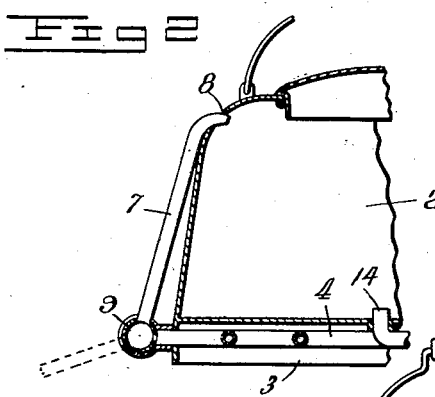
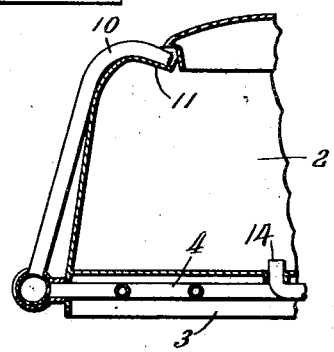
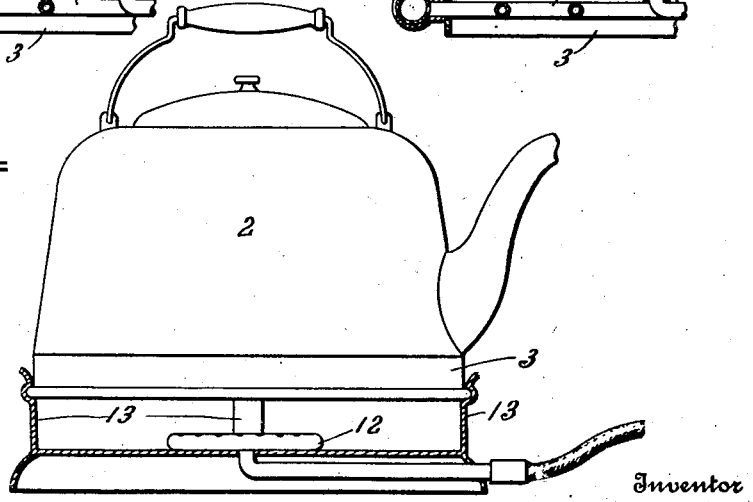
Witnesses
H. C. Robinette
A. L. Weaver
Inventor
William A. Roberson
By Lupus, Cushman & Co.
Attorneys

UNITED STATES PATENT OFFICE.

WILLIAM A. ROBERSON, OF JEFFERSONVILLE, INDIANA.

LIQUID-HEATING RECEPTACLE.

1,042,144.  Specification of Letters Patent.  Patented Oct. 22, 1912.

Application filed August 29, 1911. Serial No. 646,703.

*To all whom it may concern:*

Be it known that I, WILLIAM A. ROBERSON, a citizen of the United States, residing at Jeffersonville, in the county of Clark and State of Indiana, have invented new and useful Improvements in Liquid-Heating Receptacles, of which the following is a specification.

The present invention relates to receptacles for heating liquids, and in the present disclosure a domestic tea-kettle is utilized as one example of the adaptability of my invention, but it will be understood that the present disclosure is merely illustrative and not restrictive, and that the invention may be used in connection with other types of liquid heating receptacles.

Briefly stated, my invention contemplates the combination with a suitable receptacle of a flash coil, which is in communication with the receptacle, and in which coil the liquid will be brought to boiling point practically instantaneously when placed over a flame, said coil being provided with an outlet or discharge, so that the heated liquid may be drawn directly from the coil, if desired.

As another variation of my invention, I contemplate providing a construction by means of which the liquid will be discharged from the coil into the receptacle proper, so that a circulatory system will be formed, which will secure a rapid heating of the entire volume of liquid in the receptacle.

I contemplate, furthermore, associating with the flash coil receptacle a conveniently arranged heater so that the device, in this form, constitutes a unitary and self-contained liquid containing and heating device, which may be coupled to any fuel supply, such as the usual heating gas supply, or an electric heating current.

In order that the invention may be understood by those skilled in the art I have illustrated, in the accompanying drawings, several embodiments of my invention, and in said drawings Figure 1 is a sectional view constructed in accordance with my invention. Fig. 2 is a view similar to Fig. 1, showing the device provided with a pivoted cut-off cock for circulation of the heated liquid of the coil into and through the volume in the receptacle. Fig. 3 shows a construction similar to that in Fig. 2, but varying structurally therefrom with respect to the introduction of the faucet tip into the receptacle. Fig. 4 is a view similar to Fig. 1, showing the device combined with a heater.

Referring to the drawings by numerals, like numbers indicating like parts in the several views, 2 indicates the receptacle which may be of any suitable type, an ordinary tea-kettle being shown in the present instance. The kettle 2 is provided preferably with a depending skirt 3, which drops below the bottom of the kettle, as shown, the skirt 3 having preferably ventilating openings to insure proper combustion of the heating flame or escape for the heated air when the receptacle is in use. Lying within the skirt 3, and closely adjacent the bottom of the kettle, is a flash coil 4 which, as shown, is of spiral form, but which obviously may be of any desired construction as to form. The said coil 4 communicates at one end with the interior of the kettle, as shown, and the other end of this coil 4 is coupled outside the kettle 2, with a discharge or faucet 5. The coil 4 has also a circulatory tube 6 leading upwardly into the receptacle as shown in Fig. 1, to permit circulation of the heated liquid when the cock 5 is closed.

The faucet 5 may be of any desired type, and it will be seen that, since this faucet couples directly with the flash coil 4, hot water may be drawn directly from the coil, irrespective of the temperature of the volume of water within the receptacle, for the relatively thin film or stream of water in the coil 4 will be quickly heated or flashed, and the necessity for bringing the entire body of water in the receptacle to a high temperature before hot water can be secured, is obviated. While the faucet as stated may be of any suitable or desired type, I have shown in Figs. 2 and 3 one very convenient form in which a pivoted cut-off cock is mounted at the outlet of the coil 4. In this form of the invention, as shown in Figs. 2 and 3, I have adopted the construction just outlined, and furthermore, have made provision for a circulating system, this being secured by lengthening the spout or faucet 7, and so shaping the end of this faucet 7 as that it will enter a suitable opening in the upper part of the kettle, and deliver the heated liquid from the coil to the interior of the receptacle. In the form shown in Fig. 2, I have provided the kettle with an opening 8, with which the discharge tip of the faucet 7 registers when it is thrown to its upper position, and in which position there will be a flow from the coil through the faucet 7 and orifice 8 to the kettle. In this form of the invention I preferably provide a valve 9 between the coil and the faucet, which will be open to permit circulation when the faucet 7 is in circulating position, will be closed when the faucet 7 is moved from circulating position, and will be open when the faucet 7 is in the position shown in dotted lines in Fig. 2, this being accomplished by providing the faucet body with outlets and cut-offs, as shown in Fig. 2, so as to give the open and closed positions specified. This arrangement is of some value, in that the faucet is open only when in the circulating position, or in the discharge or coil draining position, and careless manipulation of the faucet and leaving it in an intermediate position would not result in a boiling over and spilling of the liquid. In Fig. 3 I have dispensed with the orifice 8 in the wall of the kettle, and have laid the tip of the faucet 10 in a suitably shaped groove or bulge 11, formed at the joint of the kettle mouth and lid, so that the discharge tip of the faucet 10 will deliver directly through the filling opening of the receptacle.

In the construction shown in Fig. 4, I have equipped the device with a heater, which may be permanently or detachably secured to the skirt 3, this heater 12 being of any convenient type (a gas burner being shown) and comprising the usual burner equipped with a suitable fuel supply pipe, to which may be attached the ordinary flexible feed tube, clips 13 of any effective design being provided, by which the burner 12 may be secured to the skirt of the receptacle.

While I have shown specific adaptations of my invention, it will be obvious that it may be varied to a considerable extent, without departing from the spirit of my invention, and I do not limit myself, therefore, to the mechanical details shown and described, as I regard all obvious equivalent expedients in construction as within the range of my invention.

As shown in Figs. 1, 2 and 3, the coil 4 where it enters the bottom of the receptacle will preferably be extended above the bottom, as at 14, in order that any sediment which may be in the water and be precipitated to the bottom of the receptacle will not so readily be drawn into the coil inlet 14, and the water entering the coil will, therefore, be kept in purer condition.

I claim:—

1. In a device of the class described, in combination with a liquid containing receptacle having an orifice in its upper end, a heating coil exteriorly thereof and in communication therewith, and a pivoted discharge cock connected with said coil, said cock delivering liquid directly from the coil in one position, and entering said orifice in the receptacle in the other position so as to discharge directly thereto.

2. In a device of the class described, the combination with a liquid containing receptacle having an orifice near its upper end and in one side, of a flash coil disposed beneath the bottom of the receptacle and opening at one end up through the bottom, the opposite end of the coil extending out to one side of the receptacle, a two-way valve having a fixed part secured on the outer end of the coil and a turning part in the fixed part adapted to open the coil when the turning part is adjusted to two different positions, and a tube secured to the turning part and adapted to swing therewith to extend up into said orifice in the receptacle in one open position of the valve whereby a circulation of the liquid is had through the receptacle, the coil, and the upturned tube, said tube being adapted to swing down and rotate the turning part into a different position to open the valve whereby the liquid is discharged directly from the coil through the downturned tube.

3. In a device of the character described, the combination with a liquid containing receptacle having an orifice near its upper end, of a flash coil adjacent the bottom thereof and in communication with the interior of said receptacle, a two way valve carried by the free end of said flash coil, a spout carried by said valve, the free end of said spout engaging in said orifice in said receptacle when in its raised position and discharging the contents of said receptacle and flash coil when in its lowered position, a coil inclosing and heat retaining skirt depending from said receptacle, a heater arranged directly below said coil, and means engaging with said skirt whereby to detachably connect said heater to said receptacle.

In testimony whereof I have hereunto set my hand in presence of two subscribing witnesses.

WILLIAM A. ROBERSON.

Witnesses:
CHARLES E. HALL,
A. V. CUSHMAN.